Fig. 3

Sept. 15, 1925.                     1,553,522
               H. E. DURKEE
             TAP GRINDING MACHINE
          Filed Feb. 20, 1922    6 Sheets-Sheet 4

Sept. 15, 1925.

H. E. DURKEE 1,553,522

TAP GRINDING MACHINE

Filed Feb. 20, 1922      6 Sheets-Sheet 6

Inventor
H. E. Durkee,
By Joseph K. Schofield
Attorney

Patented Sept. 15, 1925.

1,553,522

UNITED STATES PATENT OFFICE.

HENRY E. DURKEE, OF GLASTONBURY, CONNECTICUT, ASSIGNOR TO PRATT & WHITNEY COMPANY, OF NEW YORK, N. Y., A CORPORATION OF NEW JERSEY.

TAP-GRINDING MACHINE.

Application filed February 20, 1922. Serial No. 538,017.

*To all whom it may concern:*

Be it known that I, HENRY E. DURKEE, a citizen of the United States, residing at Glastonbury, in the county of Hartford and State of Connecticut, have invented certain new and useful Improvements in Tap-Grinding Machines, of which the following is a specification.

This invention relates to a machine for grinding screw threads and particularly to a machine for grinding screw threads on a tap or other cutting tool.

Also, this invention relates to a machine for relieving the screw threads while they are being ground so that taps made in this machine will not only have a correct lead and form of thread but will have freer cutting qualities, and the main portion of the screw threads on the tap will not be in contact with the work while the tap is cutting.

One feature which enables me to obtain the objects of this invention is that the work such as a tap, being ground is held in an oscillating frame, the axis of oscillation of the frame being slightly eccentric to the axis about which the work is rotated, so that while the tap is being rotated and advanced axially, it may be also simultaneously reciprocated slightly toward and from the grinding wheel as each flute of the tap is being ground.

Another feature which is advantageous is that the machine is automatic in its operation and adapted to be adjusted for different forms and sizes of screw threads having various leads.

Another object is to provide a machine of the above type which will be simple but automatic in its operation, compact, rugged and universal in its application to relieving grinding of threaded tools.

The machine is of the same general type as the thread grinding machine disclosed in application of A. E. Larsson 222,928 filed March 16th, 1918.

With these and other objects in view, my invention consists in the features of construction and operation set forth in the following specification and illustrated in the accompanying drawings.

In the accompanying drawings annexed hereto and forming a part of this specification, I have shown my invention embodied in a particular form of tap grinding machine but it will be understood that the invention can be otherwise embodied and that the drawings are not to be construed as defining or limiting the scope of the invention, the claims appended to this specification being relied upon for that purpose.

In the above drawings, I have shown but one modification of the invention which is now deemed preferable, but it is to be understood that changes and modifications may be made within the scope of the appended claims without departing from the spirit of the invention.

Briefly, my invention in its broadest aspect comprises the following principal parts: first, a base; second, a longitudinally movable work carrying table mounted thereon; third, a grinding wheel rotatably mounted and adjustably positioned manually or automatically toward or from the work;

fourth, means for rotating the work simultaneously and in timed relation with the longitudinal movement of the work carrying table; fifth, means to reciprocate the work slightly a plurality of times during each rotation thereof in accordance with the number of flutes with which the work being ground may be provided; and sixth, means to move the wheel toward or from the work at each reversal of movement of the table.

Referring more in detail to the figures of the drawings, a base 10 is shown upon which is carried a longitudinally slidable table 11 and a slide 12 on which is mounted a head 13 carrying the grinding wheel 14. These two tables or slides 11 and 12 are movable at right angles to each other.

The driving mechanism by means of which the grinding wheel 14 is rotated the work carrying slide or table 11 reciprocated. and the work rotated in reverse directions comprises a main shaft 15 extending longitudinally along the rear of the base 10. This shaft 15, at one end, is provided with a tight and a loose pulley respectively 16 and 17 over which runs a belt 18, the position of which may be controlled by the belt shifting lever 19 and adapted to move the belt 18 from its driving to idle position or vice versa. On this main drive shaft 15 is a large pulley 20 over which runs a belt 21 in driving connection with the grinding wheel spindle 22 mounted in the head 13 and carrying the grinding wheel 14. This belt 21 is preferably automatically taken up by a belt tightening pulley 23 movable about the axis of the main shaft or arm 24 to compensate for various lengths of belt required when the wheel head 13 and slide 12 are in different adjusted positions on the base 10. The belt 21 passes over idler pulleys 24 within the slide 11 so that the belt 21 may be properly guided. Also on this main driving shaft 15 is a helical gear 25 meshing with a mating helical gear 26 fastened to a transverse horizontal shaft 27 extending forwardly through the base 10. At the forward end of this shaft 27 are provided two gears 28 and 29 of different diameters which form the driving mechanism for operating the table reciprocation, work rotating and wheel slide operating mechanisms. A small pinion is also mounted on this shaft 27 preferably between the gears 28 and 29. The function of this pinion is to drive mechanism presently to be described.

Figure 3:
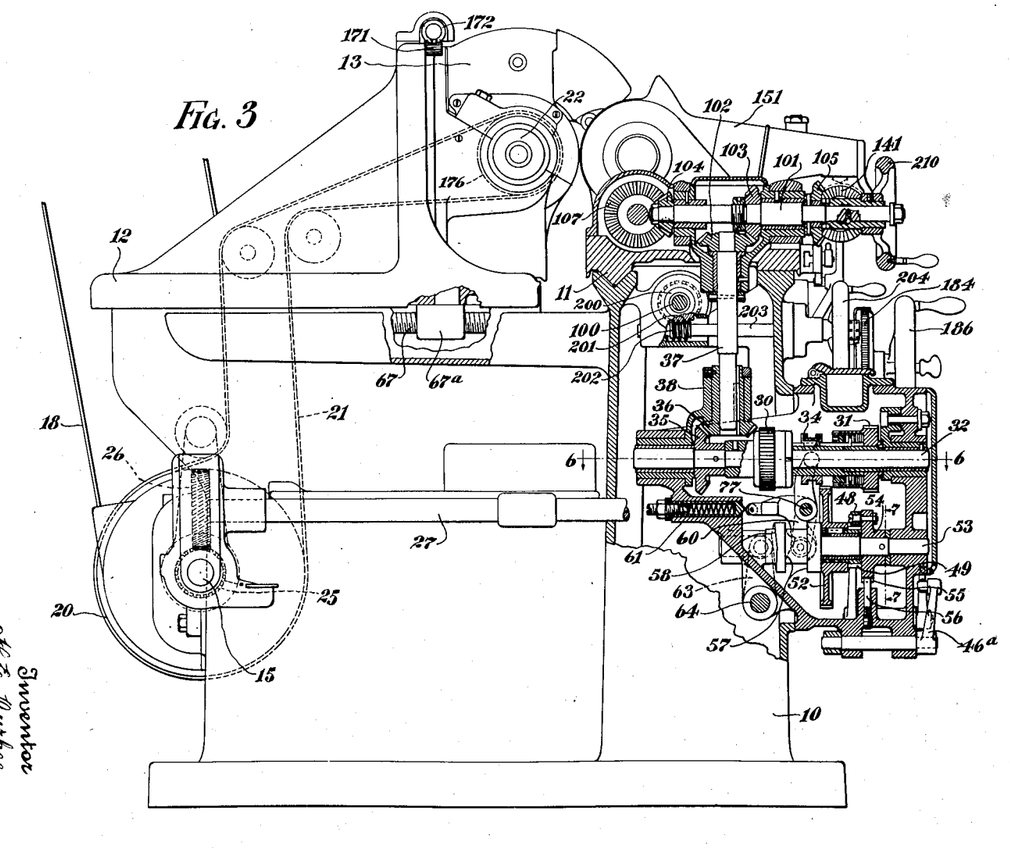
Fig. 3 is a side view of the complete machine taken from the left hand end as seen in Fig. 1, parts being shown in section to more clearly disclose the table operating mechanism.

It is necessary in griding taps and other threaded tools, to move the table past the wheel at a particular speed in timed relation to the rotation of the work. It is also necessary to withdraw the wheel from contact with the work while the table is moved back again to its initial position after the work has once passed the wheel. The mechanisms necessary to produce these movements are shown clearly in Figs. 3, 4, 6 and 7. The gears 28 and 29 on the forwardly extending shaft 27 are in driving connection with gears 30 and 31 on an intermediate shaft 32, gear 30 being directly in mesh with gear 28 and gear 31 in mesh with an idler gear 33 which meshes with gear 29. The gears 30 and 31 on the intermediate shaft 32 are loosely mounted thereon and are adapted to be placed in driving connection with a clutch member 34 splined to this shaft 32 between gears 30 and 31. As shown in Fig. 3, gears 30 and 31 are mounted on a sleeve surrounding shaft 32 and are driven through friction clutches preferably forming integral parts of the gear members. The gearing just described is such that when the clutch member 34 is in one operative position, the intermediate shaft 32 is driven in one direction and when it is in the opposite operative position, it is driven in the reverse direction. On this intermediate shaft 32 is a bevel gear 35 in mesh with a corresponding bevel gear 36 splined to a vertically extending shaft 37 which is supported at one end by a trunnion member 38 adapted to be supported by and oscillate about the axis of the intermediate shaft 32 in accordance with the angular movements of the vertical shaft 37. At its upper end this shaft 37 is in driving connection with the mechanism for reciprocating the table 11 and rotating the work which presently will be described.

In order to reverse the direction of rotation of the intermediate shaft 32 and consequently of the vertical shaft 37 by means of which the table 11 and work are operated, I provide on the forward vertical surface of the table 11 adjustable dogs 40 and 41 which contact with a bell crank lever 42 to oscillate it in either direction. Oscillation of this bell crank lever 42 through a reach arm 43 operates a bell crank lever 44 mounted adjacent the driving mechanism just described so that it will move either one or the other of the levers 45 or 46 into or out of contact with the extended portions 47 of a pawl 48. Normally, one or the other of these levers 45 or 46 is in contact with this pawl 48 so that the pawl 48 is held out of contact from a constantly rotated ratchet member 49 in driving connection with the main horizontal drive shaft 27 through pinion 51 on shaft 27 and a gear 52 on the member carrying the ratchet wheel 49.

Figure 1:
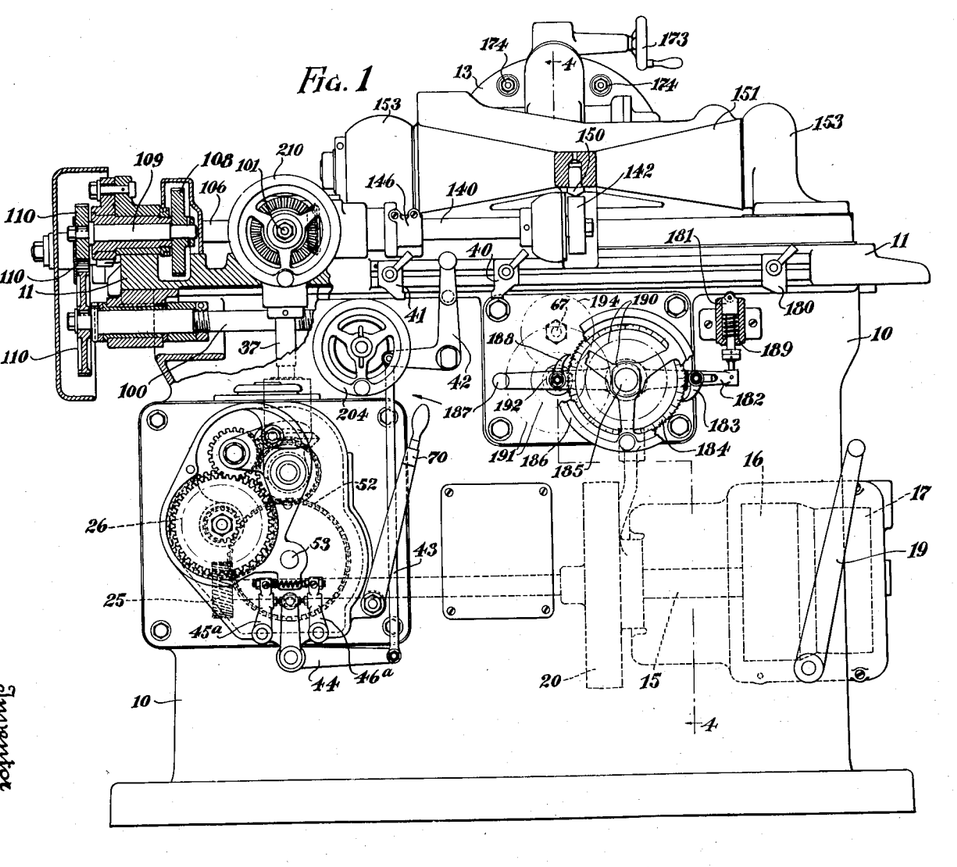
Figure 1 is a front elevation of the complete machine, parts being shown in section to more clearly disclose their construction.

Referring to Fig. 1 this mechanism for moving the levers 45 and 46 will be clearly seen. The upwardly extended arm of bell crank 44, when oscillated by movement of reach arm 43 moves the levers 45ᵃ and 46ᵃ provided on the outside of the base 10 in either direction. These levers 45ᵃ and 46ᵃ are mounted on short shafts on which are respectively mounted the pawl operating levers 45 and 46. It will be seen from the above description that but one or the other of pawls 45 and 46 can be in engagement with the extended portion of the pawl 48. Pawl 48 is mounted on a disc 54 pinned to shaft 53 so that when this pawl 48 is in engagement with the ratchet member 49, shaft 53 and disc 54 are rotated until the pawl 48 is again withdrawn from engagement with the ratchet member 49. As the gear 52 and ratchet member 49 are constantly rotated from shaft 27, this disk 54 is periodically rotated through a fraction of a revolution at each oscillation of bell cranks 42 and 44. To prevent the possibility of retrograde movement of the disc 54 and pawl 48 the disc is provided with notches 55 in its periphery engaged by a spring pressed plunger 56. The slope of one side of the notches 56 is such that rotation in one direction automatically depresses the plunger 56. At each reversal of movement of the bell crank 42 by the adjustable dogs 40 and 41, the pawl 48 is momentarily released from engagement with one of these levers 45 or 46 and therefore springs into contact with its ratchet wheel 49. This rotates the disk 54 on which the pawl 48 is mounted together with its shaft 53 through a portion of a revolution, or, until the pawl 48 comes into contact with the opposite lever 45 or 46 and is at that point again disengaged from the ratchet wheel 49.

Rotation of this pawl 48 and the drum 54 to which it is fastened serves to rotate the shaft 53 on which are mounted cams 57 and 58. One of these, namely, 57, controls the reversing clutch member 34 and the other, 58, controls the movement of the wheel slide screw 67 to move the wheel 14 toward or from the work. Referring to Fig. 3 this mechanism will be clear. At each partial revolution of the pawl 48, the disk 54 and the cam shaft 53, cams 57 and 58 are rotated as they are fast to this shaft 53. The annular face cam 57 oscillates the link 60, one arm of which is made in the form of a yoke engaging the reversing clutch 34, and another arm engages a spring pressed plunger 61, the function of which is to complete the movement of the reversing clutch 34 in either direction when it has been moved to its mid position. The face cam 58, also rotated by the pawl 48 and the shaft 53, oscillates a lever 63 and shaft 64 which, as will be seen in Fig. 4, oscillates a bell crank 65, one arm of which engages an annular groove 66 provided in the wheel adjusting lead screw 67.

At each fractional revolution, therefore, of this cam shaft 53, the reversing clutch 34 is operated from one extreme position to the other to reverse the direction of rotation of the intermediate shaft 32 which, through rotation of vertical shaft 37, reverses the direction of movement of table 11. The bell crank 65 controlling the wheel adjusting screw 67 rotatably engaged by nut 67ª depending from the lower surface of the slide 12 is also oscillated in one or the other direction to move the wheel 14 toward or from the work. The cams 57 and 58 are formed on a single member suitably fastened to shaft 53 and are so timed that the wheel 14 is held toward the work during the entire movement of the work past the wheel 14 in one direction and is moved away from the work slightly by bell crank 65 during the entire movement of the table in the opposite direction. As the reciprocatory movement of the table 11 and the rotary motion of the work are both operated from the vertical shaft 37, reversing the movement of the table by reversing the rotation of the shaft 37 also reverses the direction of rotation of the work.

It is convenient at times to be able to manually stop the driving mechanism just described independently of the main driving belt 21 so that the table 11 and work may be stopped in either direction of reciprocation and rotation. For this purpose I provide a lever 70 oscillation of which oscillates a shaft 71 and cam plate 72. Cam plate 72 has an oblique arcuate slot 73 therein (see Fig. 7) engaged by the spherical end of a bell crank lever 74 (see Fig. 4) so that oscillation of lever 70 will move the vertical arm 74ª of this lever 74 forward or back. This arm 74ª of the bell crank has a generally triangular opening 75 therein within which the free end of a lever 76 may operate. Lever 76 is on a short shaft 77 having engagement through the clutch operating yoke with the reversing clutch member 34. The form of the opening 75 is such that with the clutch member 34 in either operative position, oscillation of lever 70 will move lever 76 so that the clutch member 34 will be moved to neutral position. Movement back again of lever 70 will permit the clutch member 34 to return to the operative position from which it was moved as movement of clutch member 34 moves bell crank 60 so that plunger 61 resiliently presses against its rearward extending arm forcing it back toward the position from which it has been moved.

From the above description, it will be seen that normally while the machine is in operation, the reciprocations of the table 11 are automatically controlled by operation of the dogs 40 and 41 through which the cam shaft 43 is periodically rotated through a portion of a revolution and the reversing clutch 34 thus controlled to reverse the direction of rotation of shaft 35. Also, should it be desirable to temporarily stop operation of the table, it is only necessary to manually move lever 70 in the direction of the arrow shown in Fig. 1 through the clutch 34 to neutral position and so stop rotation of shaft 22 and connected parts.

As the position of the work engaging surface of the grinding wheel 14 must be absolutely predetermined at each passage of the work to insure accuracy, I provide the following mechanism: A weight 85 is mounted within the base 10 (see Fig. 4) to which is attached a cable 86 passing over an idler wheel 87, the opposite end of the cable 86 being made fast to the lower surface of the wheel slide 12. By this mechanism, the wheel 14 and its slide 12 is held in the extreme forward position permitted by the screw 67. As the movement of the bell crank lever 65 operated by cam 58 permitting the wheel 14 to move forward might be unduly rapid and therefore unduly jar the machine, I provide a small dash pot 88 at the rear of this wheel adjusting screw 67. This comprises a cylinder within which a piston 89 adjustably fastened to the rear of the adjusting screw 67 may operate. The internal cylindrical surface of the dash pot is provided with by-passes 90 through a portion of its length permitting a rapid flow of the fluid with which the dash pot is filled from one side of the piston 89 to the other. Adjacent the forward end of the cylinder these by-passes are discontinued so that when the adjusting screw 67 and wheel slide 12 move forwardly, the piston 89 within the dash pot 88 cuts off the by-passes 90 for the flow of fluid from one side of the piston to the other just before the wheel reaches its forwardmost position. The piston 89 is provided with several very small holes 91 allowing a slow passage of fluid to the opposite side of the cylinder so that the adjusting screw 67 together with the wheel head 13 may move slowly into its forwardmost position. This dash pot 88, therefore, checks the rapid forward movement of the wheel slide 12 and prevents any undue jar or vibration to the mechanism.

As above stated the table 11 is slidably mounted on guideways provided on the upper surface of the base 10 and may be reciprocated longitudinally of the machine by means of a lead screw 100 driven in any preferred manner as by the driving connections shown in Fig. 1. These will now be described. It has been shown that the direction of rotation of the vertical shaft 37 is reversed at each extremity of the table movement, this being accomplished by the adjustable dogs 40 and 41 operating lever 44 in the driving mechanism. This vertical shaft 37 controls, through appropriate mechanism, the rotation of the work, the relative distance traversed by the table with each complete rotation of the work, and also controls the work oscillating mechanism by means of which the threads being ground are formed with a suitable relief. On the work carrying table 11 is mounted a horizontal shaft 101 which is in driving connection by means of a pair of bevel gears 102 and 103 with the vertical shaft 37 above referred to. This shaft 101 is provided with two other bevel gears 104 and 105, one of which, 104, drives a shaft 106 through bevel gear 107. Shaft 106 at one end is in driving connection with a gear 108 on a short intermediate shaft 109 suitably mounted on an extension of the table 11. This shaft 109 through transposing gears 110 is in driving connection with the table operating screw 100 as seen in Fig. 1. By changing the ratio of transposing gears 110 at the ends of the intermediate shaft 109 and the lead screw 100, the amount of longitudinal travel of table 11 for each rotation of the driving shaft 106 may be varied. Also, on this shaft 106 is a spur gear 112 (see Fig. 8) which is in driving connection with a work rotating means provided in the headstock 113. This preferably comprises a gear 114 and sleeve 115 rotatably mounted on a fixed shaft 116 upon which the work holding center 117 is fitted. Rotation of the shaft 106 through the gearing above described rotates the sleeve 115, which is provided with a work driving dog 118. The work is therefor rotated in timed relation to the rotation of the vertical driving shaft 27 and in a direction dependent upon the rotation of this shaft.

Figures 5, 8, 9, 10, 11:
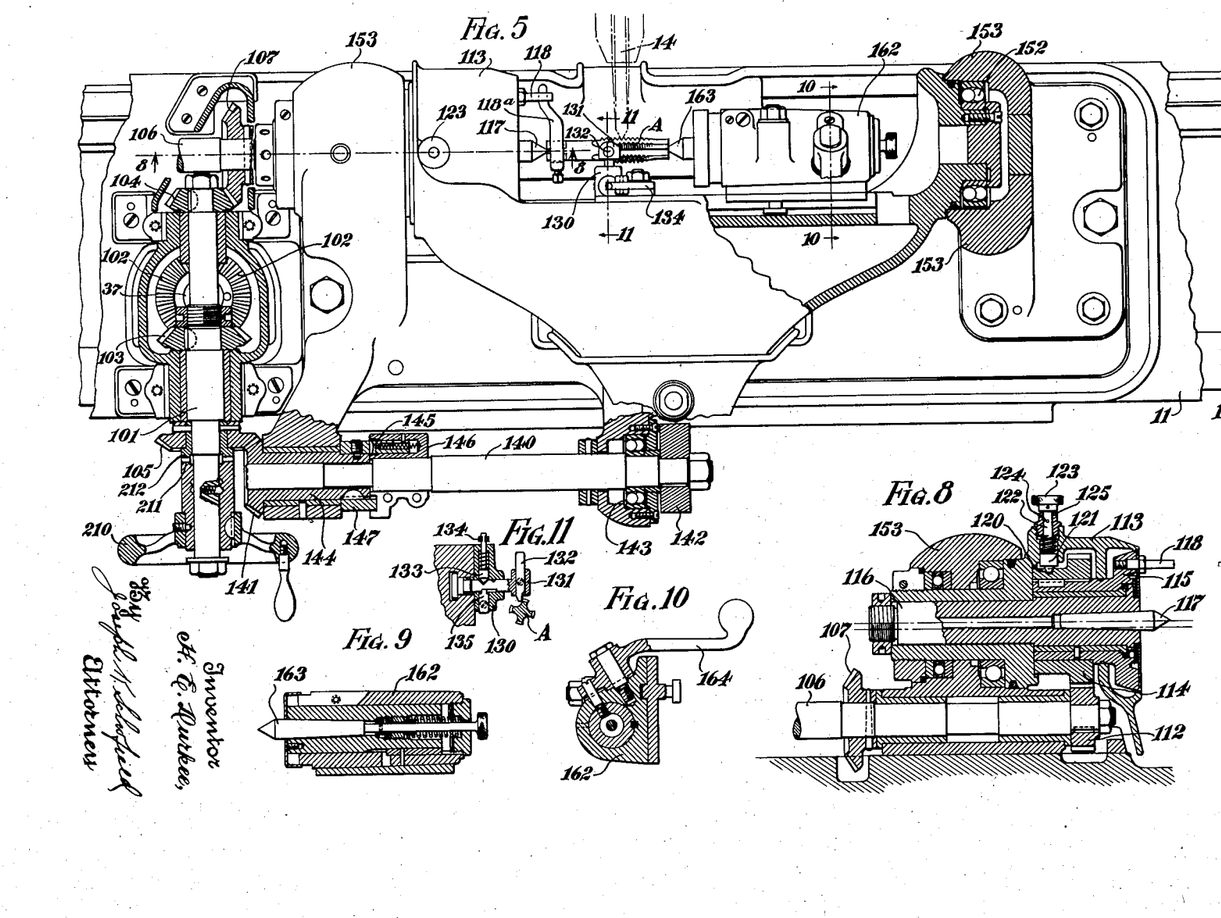
Fig. 5 is a plan view of a portion of the machine.
Fig. 8 is a sectional view of the work rotating and supporting means.
Fig. 9 is a longitudinal sectional view of a tail-stock supporting the work.
Fig. 10 is a transverse sectional view of the same.
Fig. 11 is a detail view of the work locating means.
Figure 6:
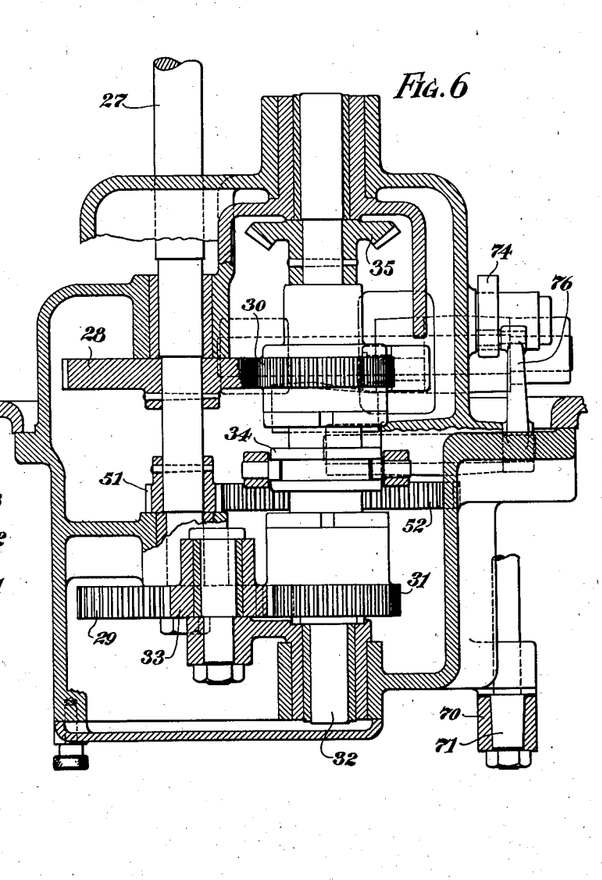
Fig. 6 is a sectional view of the table operating mechanism taken on line 6—6 of Fig. 3.
Figure 7:
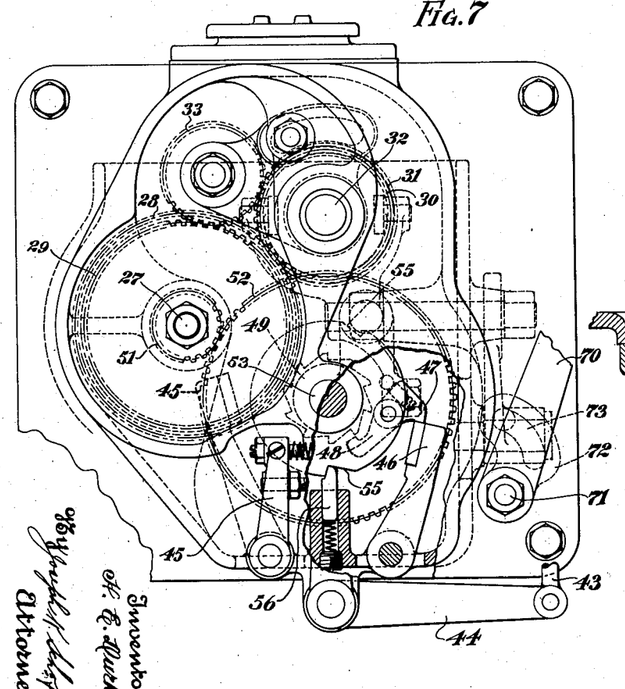
Fig. 7 is a front elevation of the table operating mechanism, a part being shown on line 7—7 of Fig. 3.

For convenience in adjusting the work in position when it is initially set up, I provide the sleeve 115 with a depression 120 in its periphery adapted to be engaged by a spring pressed plunger 121. This plunger 121 is carried on a short bar 122 having a suitable handle 123 permitting it to be engaged with the depression 120 in the work rotating sleeve 115 or be held positively out of engagement therewith. For this purpose a pin 124 in the bar or rod 122 and outstanding therefrom may be engaged with a notch 125 to hold the plunger from engagement with the depression 120 or with a deep slot permitting the plunger 121 to engage the depression 120. This mechanism therefore assures proper location of the work driver 118 each time work is to be initially placed in position for grinding. The work also must be mounted in such a manner that the front cutting surfaces of the taps A are properly located relative to the driving means 118. This is for the reason that the relieving motion of the work must always start at the time abrasive wheel 14 is in engagement with the front cutting surfaces of a flute. I therefore detachably mount a bracket 130 on a part of the work carriage to be described more fully in another part of the specification. This has an extended arm 131 carrying a finger 132. The lower pointed end of finger 132 is adapted to engage the cutting edge of a flute in the tap A as shown in Figs. 5 and 11. To move the arm 131 into or out of operative position, a spring pressed plunger 133 is provided engaging a notched portion of the arm 131. A small lever 134 permits manual operation of plunger 133. A positioning finger 135 is provided entering a spline in the arm 131. In the operative position of the arm 131, this finger 132 engages one end of the spline while the plunger 133 normally forces the arm 131 outwardly. To adjust the work positioning device for different diameters of work, it is only necessary to vertically adjust finger 132 within arm 131. With the driver 118 and the tap blank A so positioned, the dog 118a may be properly adjusted and attached to the blank A to engage the driver 118 and rotate the blank A therefrom.

Figure 4:
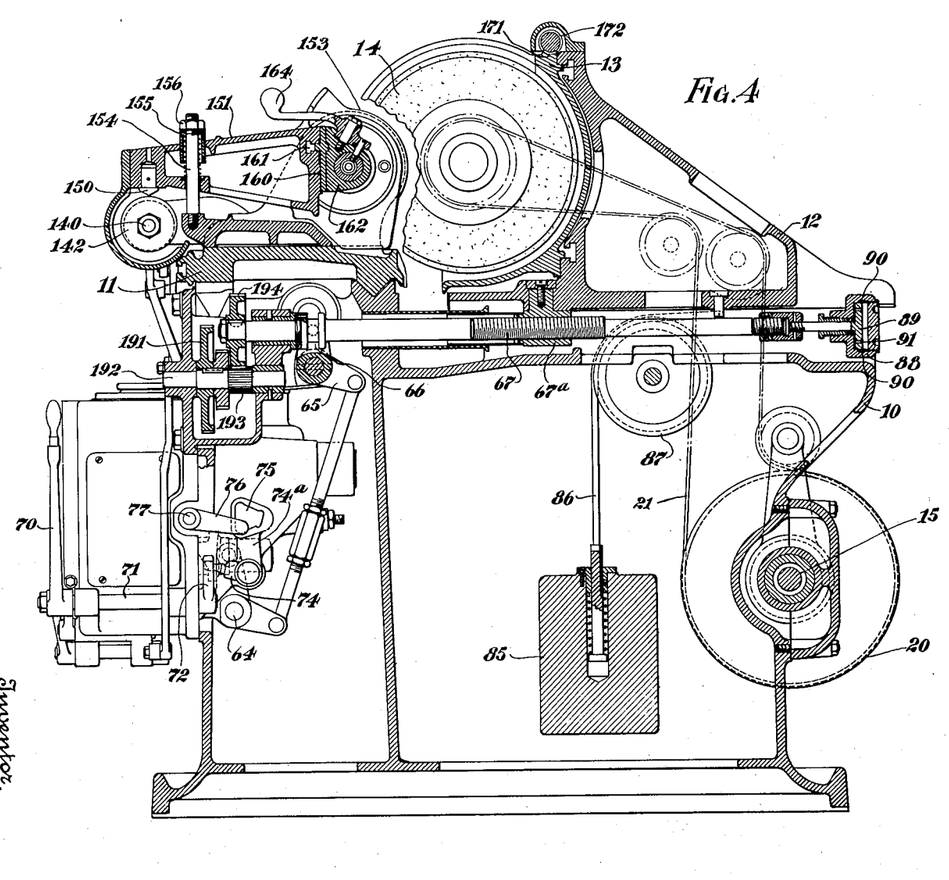
Fig. 4 is a sectional view taken on line 4—4 of Fig. 1.

As above indicated, the work is oscillated slightly to and fro a plurality of times during its rotation so that each of the flutes of the tap A being ground will be provided with relieved threads. This mechanism is shown in Figs. 1, 4 and 5. A shaft 140 adapted by a bevel gear 141 to be placed in driving connection with the bevel gear 105 on the short shaft 101 carries an eccentric cam 142 at its outer end. This cam 142 is rotated a plurality of times for each rotation of the work driver 118 and the speed ratio is such that the cam 142 when operating on the usual form of taps makes four complete revolutions for each single revolution of the work rotating sleeve 115 and driver 118. The shaft 140 preferably rotates in ball-bearing 143 at one end and at the opposite end is rotatably mounted in sleeve 144 preferably integral with bevel gear 141. The driving connection for shaft 140 from gear 141 and sleeve 144 is in the form of a ratchet, the pawl 145 of which is resiliently mounted in member 146 clamped to shaft 140. Pawl 145 is adapted to engage a single toothed clutch member 147 fast to sleeve 144. From this construction, it will be seen that rotation in one direction of gear 141 rotates cam 142 but reverse rotation permits ratchet 145 to ride over the clutch member and thus prevents rotation of cam in the wrong direction.

Referring now to Figs. 4 and 5, it will be seen that the cam 142 is engaged by a rider 150 at the forward end of an oscillating work carrying frame 151. This oscillating frame 151 is mounted on suitable ball-bearings 152 carried by brackets 153 on the work reciprocating table 11. With each rotation of the cam 142, this frame 151 will be slightly oscillated about the axis of the ball-bearings 152. In order to resiliently hold the rider 150 in contact with the periphery of the cam 142, a stud 154 is provided fastened into a fixed member on the table 11 and which, through a spring 155 as shown in Fig. 4, depresses the forward end of the frame. The tension of this spring 155 may be varied by adjustment of the nut 156 on the upper end of the stud 154.

The rear part of the frame 151 is provided with a substantially vertical surface 160 which is provided with a T-slot 161 by means of which a tailstock 162 may be adjustably clamped to the frame 151. This tailstock 162 as seen in Fig. 9 carries a spring pressed center 163 in alignment with the center 117 in the headstock 113. Longitudinal movement of this tailstock center 163 together with its block 162 is accomplished by a short hand lever 164 suitably pivoted to the tail block 162. The common axis of the headstock and tailstock centers 117 and 163 is slightly out of alignment with the axis of the ball-bearings 152 about which the frame 151 oscillates. As diagrammatically indicated in Fig. 8, the axis about which the frame oscillates is in one horizontal plane and the axis of the work carrying centers is in a plane slightly above this axis. The two center lines in this figure represent respectively the axis of oscillation of frame 151 and the axis of rotation of the work A. The result of this is that with each oscillation of the frame 151, the work is carried slightly toward and from the abrasive wheel 14. As mentioned above, this action takes place a plurality of times during each rotation of the work. As there are usually four flutes to taps, the frame 151 is oscillated four times during each complete rotation of the work and therefore each flute on the work, as it rotates past contact with the wheel, is slightly relieved, thus improving the cutting qualities of the tap.

Figure 2:
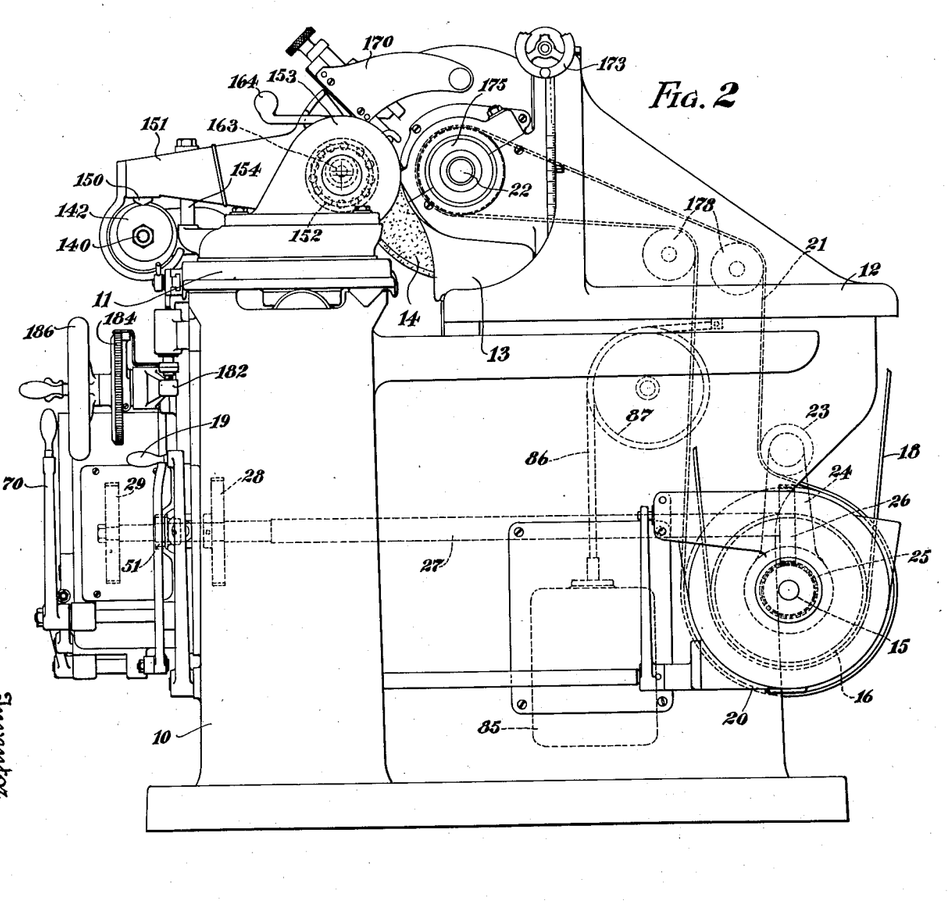
Fig. 2 is a side view of the complete machine taken from the right hand end as seen in Fig. 1.

The cutting wheel 14 comprises a grinding wheel, the periphery of which is bevelled upon opposite sides to conform to the angle subtended between the opposite sides of the threads being ground. This is indicated in Fig. 5 of the drawings. The mid plane of the wheel is also dressed off so that it will have a narrow cylindrical portion corresponding to the flat surface at the bottoms of the threads. A truing attachment 170, as shown in Fig. 2, may be utilized for dressing each of these work engaging surfaces of the wheel. This attachment forms the subject matter of co-application filed by me, Serial No. 538,018, dated Feb. 20, 1922. The grinding wheel 14, as above stated, is mounted upon wheel head 13 which is adjustably fastened to the wheel slide 12 so that the plane of the wheel may be tilted through a slight angle about a horizontal axis and the slope of the wheel will correspond with the helix angle of the threads being ground. Preferably, I provide this wheel head 13 with a segment of a worm wheel 171 in engagement with a worm 172 so that rotation of the worm 172 by handle 173 will tilt the wheel 14 to any desired angle indicated by a zero line on the wheel slide 12 and graduations on the wheel head 13. Clamping bolts 174 engaging a T-slot in a wheel slide 12 securely hold the wheel head 13 in adjusted position. The wheel head 13 is also provided with opposite bearings 175 in which the shaft 22 upon which the wheel 14 is mounted may rotate, and rotation of the wheel 14 is obtained by a pulley 176 on this shaft 22 rotated by means of the belt 21 driven by pulley 20 on the main driving shaft 15. A pair of idlers 178 mounted in the wheel slide guide the belt in such a position that it will not interfere with any of the operative parts of the mechanism.

I also provide means for automatically feeding the wheel 14 forward slightly after each passage of the wheel along the work. These means comprise a dog 180 adjustably mounted in the T-slot provided in the forward vertical surface of the table 11 and which at each passage of the table 11 in one direction depresses a spring pressed plunger 181 and oscillates an arm 182. This arm 182 oscillates a pawl 183 resiliently held in engagement with a ratchet wheel 184 on a shaft 185 so that after each passage of the work in one direction, the wheel 14 may be advanced slightly toward the work which distance may be varied by vertical adjustment of plunger 181. A hand wheel 186 is also mounted on shaft 185 so that the position of the wheel may be manually adjusted quickly to any desired position. Preferably, arm 182 is extended to the opposite side of the hand wheel 186 and is formed with a handle 187 so that the arm 182 may be manually oscillated through a small angle to slightly rotate ratchet wheel 184 and feed the wheel 14 by rotation of the adjusting screw 67. A pawl 188 is mounted on this extension of the arm 182 adapted to engage the ratchet wheel 184. This pawl 188 on the arm 182 may preferably be thrown out of operation when the wheel is being fed automatically. The plunger 181 by means of which the arm 182 is automatically operated from dog 180 is returned to normal position carrying with it the lever by means of a small helical spring 189.

On the shaft 185 in rear of the ratchet wheel 184 are the driving connections between shaft 185 and screw 67. These comprise one or more gears 190 on shaft 185 in mesh with gears 191 on an intermediate shaft 192. On this intermediate shaft 192 is a gear 193 in mesh with a gear 194 on the forward end of the feed screw 67 so that rotation of the shaft 185 by the ratchet wheel 184 rotates the feed screw through a small angle and thus advances the wheel slightly toward the work. As a plurality of gears 191 are mounted on the shaft 185 and on the intermediate shaft 192, any pair of which may be thrown into operative connection, the feed of the wheel toward the work may be either relatively fast or relatively slow. It will be noticed also that this manual or automatic feed mechanism is entirely independent of the mechanism including bell crank lever 65 for bodily moving the screw 67 forward or back for disengaging the wheel 14 from the work during the movement of the table in one direction. For this reason the pinion 193 on the intermediate shaft 192 engaging the gear 194 on the forward end of the screw 67 is made wider than the face of this gear and thus space is permitted between the gear 194 and the bearing for the screw 67 to permit forward and rearward movement of this screw.

When the work is first placed in operative position on centers 117 and 163, the plane of the wheel 14 must be so placed that its work engaging surfaces will enter the space between two adjacent threads of the tap A. As it would be unsatisfactory to provide means to rotate screw 10 manually and independently of rotation of the work to properly adjust the relative position of the table and carriage, I provide a special mechanism permitting this adjustment to be readily made. It has been seen above that the table operating screw 100 is in engagement with a nut 200 housed within the base 10. By rotating this nut 200 through a small angle, the table 11 can be moved in either direction through a slight distance independent of any of the driving mechanisms for the work or table above described. In order to rotate this nut, I mount thereon a worm wheel 201 in engagement with a worm 202. I mount this worm 202 upon a shaft 203 extending forwardly through the base 10. On the forward end of this shaft 203 I mount a hand wheel 204 permitting ready adjustment of the nut 200 and thus of the table 11 independently of the rotation of the work.

It is also desirable to provide manual means for operating the entire mechanism independently of any of the driving mechanism. This is primarily intended for use while the machine is being started in normal operation so that the mechanism may be turned a few revolutions to determine that the proper operation is given each part. For this purpose I mount a hand wheel 210 on the forward end of shaft 101. This is preferably rotatably mounted thereon and adapted to be placed in driving connection therewith by movement rearward to engage teeth 211 on a sleeve mounted on the hand wheel member and teeth 212 on a sleeve providing the bearing for gear 105. By rotating this hand wheel while the clutch 34 is in neutral position, the entire mechanism of the construction may be manual.

What I claim is:

1. The combination in a grinding machine of means for supporting and rotating a blank to be ground, a slidable table carrying said supporting means, a rotatable grinding wheel for grinding generally helicoidal surfaces on the blank, means for effecting longitudinal movement of the blank past the wheel in timed relation to its rotation, means for periodically reversing the rotative and longitudinal movement of the blank, and means carried by said table to move said blank toward and from the wheel a plurality of times during each rotation.

2. The combination in a grinding machine of means including a headstock and spindle for supporting and rotating a blank to be ground, a slidable table carrying said headstock, a rotatable grinding wheel for grinding generally helicoidal surfaces on the blank, means connected with said spindle for effecting relative longitudinal movement of the blank past the wheel in timed relation to its rotation, means for periodically reversing the rotative and longitudinal movement of the blank, and an oscillating frame carried by said table to move said blank toward and from the wheel a plurality of times during each rotation.

3. The combination in a grinding machine of means including a headstock and spindle for supporting and rotating a blank to be ground, a slidable table carrying said headstock, a rotatable grinding wheel for grinding a generally helicoidal surface on the blank, means connected with said spindle for effecting relative longitudinal movement of the blank past the wheel in timed relation to its rotation, means for periodically reversing the rotative and longitudinal movement of the blank, and means carried by said table to move said blank toward and from the wheel a plurality of times during each rotation while moving in one direction and in timed relation thereto.

4. The combination in a grinding machine of means including a headstock and spindle for supporting and rotating a blank to be ground, a slidable table carrying said headstock, a rotatable grinding wheel for grinding a plurality of generally helicoidal surfaces on the blank, means connected with said spindle for effecting relative longitudinal movement of the blank past the wheel in timed relation to its rotation, means for periodically reversing the rotative and longitudinal movement of the blank, and means comprising an oscillating frame on said table to move said blank toward and from the wheel a plurality of times during each rotation while moving in one direction and in timed relation thereto.

5. The combination in a grinding machine of means including a headstock and spindle for supporting and rotating a blank to be ground, a slidable table carrying said headstock, a rotatable grinding wheel for grinding a plurality of generally helicoidal surfaces on the blank, means connected with said spindle for effecting relative longitudinal movement of the blank past the wheel in timed relation to its rotation, means for periodically reversing the rotative and longitudinal movement of the blank, and an oscillating frame on said table adapted to oscillate about an axis eccentric to said spindle to move said blank toward and from the wheel a plurality of times during each rotation while moving in one direction and in timed relation thereto, said last mentioned means being inoperative while said blank is moving in the opposite direction.

6. The combination in a grinding machine of means for supporting and rotating a blank to be ground, a slidable table carrying said headstock, a rotatable grinding wheel for grinding a plurality of generally helicoidal surfaces on the blank, means for effecting relative longitudinal and rotative movement of said spindle in either direction between the blank and the wheel, automatic means for periodically reversing the rotative and longitudinal movement of the blank, and cam operated means carried by and moving with said table to move said blank toward and from the wheel a plurality of times during each rotation.

7. The combination in a grinding machine of means for supporting and rotating a blank to be ground, a slidable table carrying said supporting means, a rotatable grinding wheel for grinding a plurality of generally helicoidal surfaces on the blank, means for effecting relative longitudinal and rotative movement of said spindle in either direction between the blank and the wheel, automatic means for periodically reversing the rotative and longitudinal movement of the blank, and automatic means comprising a cam actuated frame on said table to move said blank toward and from the wheel a plurality of times during each rotation.

8. The combination in a grinding machine of means including a headstock and spindle for supporting and rotating a blank to be ground, a slidable table carrying said headstock, a rotatable grinding wheel for grinding a plurality of generally helicoidal surfaces on the blank, means connected with said spindle for effecting relative longitudinal and rotative movement of said spindle in either direction between the blank and the wheel, automatic means for periodically reversing the rotative and longitudinal movement of the blank, and automatic means comprising a frame carried by said table to move said blank toward and from the wheel a plurality of times during each rotation while moving in one direction and in timed relation thereto.

9. The combination in a grinding machine of means for supporting and rotating a blank to be ground, a slidable table carrying said headstock, a rotatable grinding wheel for grinding a plurality of generally helicoidal surfaces on the blank, means for effecting relative longitudinal and rotative movement of said spindle in either direction between the blank and the wheel, automatic means for periodically reversing the rotative and longitudinal movement of the blank, and automatic cam operated means carried by and moving with said table to move said blank toward and from the wheel a plurality of times during each rotation while moving in one direction and in timed relation thereto.

10. The combination in a grinding machine of means including a headstock and spindle for supporting and rotating a blank to be ground, a slidable table carrying said headstock, a rotatable grinding wheel for grinding a plurality of generally helicoidal surfaces on the blank, means connected with said spindle for effecting relative longitudinal and rotative movement of said spindle in either direction between the blank and the wheel, automatic means for periodically reversing the rotative and longitudinal movement of the blank, cam operated means carried by said table to move said blank toward and from the wheel a plurality of times during each rotation while moving in one direction and in timed relation thereto, said cam operated means being inoperative while said blank is moving in the opposite direction.

11. The combination in a grinding machine of means including a longitudinally movable headstock and spindle for supporting and rotating a blank to be ground, a rotatable grinding wheel for grinding generally helicoidal surfaces on the blank, a rotatable lead screw connected with the headstock for longitudinal movement therewith, a fixed nut engaging the lead screw, gearing connecting the spindle and lead screw, means for driving and periodically reversing the spindle and thus reversing the lead screw and headstock, and means movable with the headstock for oscilllating the blank toward and from the wheel in timed relation with its rotation and longitudinal movement.

12. The combination in a grinding machine of means including a longitudinally movable headstock and spindle for supporting and rotating a blank to be ground, a rotatable grinding wheel for grinding generally helicoidal surfaces on the blank, a rotatable lead screw connected with the headstock for longitudinal movement therewith, a fixed nut engaging the lead screw, gearing connecting the spindle and lead screw, means for driving and periodically reversing the spindle and thus reversing the lead screw and headstock, and means movable with said headstock and driven by said gearing for oscillating the blank toward and from the wheel in timed relation with its rotation and longitudinal movement.

13. The combination in a grinding machine of means including a longitudinally movable headstock and spindle for supporting and rotating a blank to be ground, a rotatable grinding wheel for grinding generally helicoidal surfaces on the blank, a rotatable lead screw connected with the headstock for longitudinal movement therewith, a fixed nut engaging the lead screw, gearing connecting the spindle and lead screw, means for driving and periodically reversing the spindle and thus reversing the lead screw and headstock, and automatic cam operated means comprising an oscillatory frame movable with the headstock for oscillating the blank toward and from the wheel in timed relation with its rotation and longitudinal movement while moving in one direction.

14. The combination in a grinding machine of means including a longitudinally movable headstock and spindle for supporting and rotating a blank to be ground, a rotatable grinding wheel for grinding threads on the blank, a rotatable lead screw connected with the headstock for longitudinal movement therewith, a fixed nut engaging the lead screw, gearing connecting the spindle and lead screw, means for driving and periodically reversing the spindle and thus reversing the lead screw and head stock, and automatic cam operated means comprising an oscillatory frame movable with the headstock for oscillating the blank toward and from the wheel in timed relation with its rotation and longitudinal movement while moving in one direction, said means being rendered inoperative while said blank is moving in the opposite direction.

15. The combination in a grinding machine of means including a longitudinally movable headstock and spindle for holding and rotating a blank to be ground, a rotatable grinding wheel for grinding generally helicoidal surfaces on the blank, a rotatable lead screw connected with the headstock for longitudinal movement therewith, a fixed nut engaging the lead screw, gearing connecting the spindle and lead screw, means for driving and periodically reversing the spindle and thus reversing the lead screw and headstock, an oscillating frame movable with said headstock, a cam shaft driven from said gearing, and means on said cam shaft for oscillating the blank toward and from the wheel a plurality of times during each blank rotation in timed relation with its rotation and longitudinal movement.

16. The combination in a grinding machine of means including a headstock and spindle for holding and rotating a blank to be ground, a slidable table carrying said headstock, a rotatable grinding wheel for grinding threads on the blank, means connected with the headstock for effecting relative longitudinal movement between the blank and the wheel in timed relation to the blank rotation, means for periodically reversing the blank rotation and longitudinal movement, means for disengaging the wheel from the blank at the end of movement in one direction and for re-engaging the wheel with the blank at the end of movement in the other direction, and means carried by and movable with said table to oscillate said blank toward and from the wheel in timed relation to the blank rotation and longitudinal movement.

17. The combination in a grinding machine of means including a headstock and spindle for holding and rotating a blank to be ground, a slidable table for carrying said headstock, a rotatable grinding wheel for grinding threads on the blank, means connected with the headstock for effecting relative longitudinal movement between the blank and the wheel in timed relation to the blank rotation, means for periodically reversing the blank rotation and longitudinal movement, means for disengaging the wheel from the blank at the end of movement in one direction and for re-engaging the wheel with the blank at the end of movement in the other direction, and automatic means carried by said table to oscillate said blank toward and from the wheel in timed relation to the blank rotation and longitudinal movement.

18. The combination in a grinding machine of means including a headstock and spindle for holding and rotating a blank to be ground, a slidable table carrying said headstock, a rotatable grinding wheel for grinding threads on the blank, means connected with the headstock for effecting relative longitudinal movement between the blank and the wheel in timed relation to the blank rotation, means for periodically reversing the blank rotation and longitudinal movement, means for disengaging the wheel from the blank at the end of movement in one direction and for re-engaging the wheel with the blank at the end of movement in the other direction, and means carried by and movable with the table to oscillate said blank toward and from the wheel in timed relation to the blank rotation and longitudinal movement while said blank is moving in one direction.

19. The combination in a grinding machine of means including a headstock and spindle for holding and rotating a blank to be ground, a slidable table carrying said headstock, a rotatable grinding wheel for grinding threads on the blank, means connected with the headstock for effecting relative longitudinal movement between the blank and the wheel in timed relation to the blank rotation, means for periodically reversing the blank rotation and longitudinal movement, means for disengaging the wheel from the blank at the end of movement in one direction and for re-engaging the wheel with the blank at the end of movement in the other direction, and automatic cam operated means carried by and movable with the table to oscillate said blank toward and from the wheel in timed relation to the blank rotation and longitudinal movement while said blank is moving in one direction.

20. The combination in a grinding machine of means including a headstock and spindle for holding and rotating a blank to be ground, a slidable table carrying the headstock, a rotatable grinding wheel for grinding threads on the blank, means connected with the headstock for effecting relative longitudinal movement between the blank and the wheel in timed relation to the blank rotation, means for periodically reversing the blank rotation and longitudinal movement, means for disengaging the wheel from the blank at the end of movement in one direction and for re-engaging the wheel with the blank at the end of movement in the other direction, and automatic cam operated means comprising an oscillating frame carried by and movable with said table to oscillate said blank toward and from the wheel in timed relation to the blank rotation and longitudinal movement while said work is moving in one direction, said means being rendered inoperative while said blank is moving in the opposite direction.

21. A tap grinding machine comprising in combination, a base, a table slidable thereon, means to move said table longitudinally therealong, an oscillating frame on said table, a tap supporting and rotating means on said oscillating frame, the axis of said tap being parallel to but out of alignment with the axis of oscillation of said frame, means to oscillate said frame in timed relation with the rotation of said tap to move said tap toward and from a cutting wheel, a common driving means for rotating said tap, reciprocating the table along the base and oscillating said frame, and a cutting wheel adapted to engage the threaded portions of said tap.

22. A tap grinding machine comprising in combination, a base, a table slidable thereon, means to move said table longitudinally therealong, an oscillating frame on said table, a tap supporting and rotating means on said oscillating frame, the axis of said tap being parallel to but out of alignment with the axis of oscillation of said frame, automatic means to oscillate said frame in timed relation with the rotation of said tap to move said tap toward and from a cutting wheel, a common driving means for rotating said tap, reciprocating the table along the base and oscillating said frame, and a cutting wheel adapted to engage the threaded portions of said tap.

23. A tap grinding machine comprising in combination, a base, a table slidable thereon, means to move said table longitudinally therealong, an oscillating frame on said table, a tap supporting and rotating means on said oscillating frame, the axis of said tap being parallel to but out of alignment with the axis of oscillation of said frame, automatic cam operated means to oscillate said frame in timed relation with the rotation of said tap to move said tap toward and from a cutting wheel, a common driving means for rotating said tap, reciprocating the table along the base and oscillating said frame, and a cutting wheel adapted to engage the threaded portions of said tap while said table is moving in one direction.

24. A tap grinding machine comprising in combination, a base, a table slidable thereon, means to move said table longitudinally therealong, an oscillating frame on said table, a tap supporting and rotating means on said oscillating frame, the axis of said tap being parallel to but out of alignment with the axis of oscillation of said frame, automatic cam operated means to oscillate said frame in timed relation with the rotation of said tap to move said tap toward and from a cutting wheel, a common driving means for rotating said tap, reciprocating the table along the base and oscillating said frame in timed relation to each other, a cutting wheel adapted to engage the threaded portions of said tap while said table is moving in one direction, and means to disengage the wheel from the work when the table is moving in the opposite direction.

In testimony whereof, I hereto affix my signature.

HENRY E. DURKEE.